Patented Sept. 22, 1942

2,296,395

UNITED STATES PATENT OFFICE 2,296,395

PROCESS FOR CRACKING CARBONACEOUS MATERIALS

Wilhelm Michael and Adam Buettner, Ludwigshafen-on-the-Rhine, Germany; vested in the Alien Property Custodian No Drawing. Application July 29, 1938, Serial No. 221,972. In Germany August 9, 1937

3 Claims. (Cl. 196—52)

The present invention relates to improvements in the cracking of carbonaceous material.

We have found that hydrocarbon products having a lower boiling point can be obtained in a high yield and with negligible waste through the formation of gaseous hydrocarbons or highly polymeric condensation products, if liquid or semi-solid carbonaceous materials having a higher boiling point are split up in the presence of a mixture of aluminus oxide and boric acid obtained by mixing an alumina gel with boric acid.

The constituents of the catalyst may be mixed in any desired proportion, preferably however in about equal proportions. The catalyst may be prepared by precipitating an alumina gel from a solution of an aluminum salt by means of a base, more particularly ammonia, mixing the said gel, preferably while still in a moist condition, with boric acid flakes or soaking it with a solution of boric acid, then heating the mixture and, if desired, giving it a suitable shape, for example by pressing.

As initial materials may be mentioned mineral oils, tars, extraction products of solid carbonaceous materials, cracking products, destructive hydrogenation products of coal, tars, mineral oils, wood or lignin or oils produced synthetically from carbon monoxide and hydrogen as well as fractions of the said initial materials. The said materials are passed over the catalyst at a temperature of between amout 300° and 700° C. or more, under atmospheric, reduced or increased pressure, as for example at from 10 to 200 atmospheres and, if desired, in the presence of gases, such as hydrogen, steam, nitrogen or oxides of carbon.

In the said process the catalyst according to the present invention exerts a particularly high cracking action and allows of cracking hydrocarbons having a higher boiling point range into a benzine having superior knocking properties. If its efficiency subsides after a prolonged use it may easily be restored by a treatment with gases containing oxygen.

The following example will further illustrate the nature of this invention but the invention is not restricted to this example. The parts are by weight.

Example 100 parts of crystallized aluminum nitrate are dissolved in 300 parts of water and from the said solution aluminum hydroxide is precipitated by the addition of concentrated aqueous ammonia. The precipitate is filtered off by suction, washed, thoroughly stirred with 17 parts of crystallized boric acid and dried at 200° C.

The dry gel is pea-sized, entered into a reaction chamber and a middle oil from a German mineral oil, with a boiling point of between 200° and 350° C., is passed thereover in the vapor form at a temperature of 460° C. under atmospheric pressure. A highly anti-knock benzine is thus obtained in a yield of about 50 per cent of the initial material without an appreciable formation of gases or condensation products.

What we claim is:

1. A process for cracking liquid or semi-solid carbonaceous material which comprises using a catalyst containing aluminum oxide and boric acid obtained by mixing an undried alumina gel with boric acid.

2. Method of cracking hydrocarbon oils which comprises passing the oil in vapor form while at cracking temperature in contact with a catalyst comprising alumina gel and boron oxide and maintaining the oil in contact with the catalyst for a period sufficient to obtain a substantial amount of cracking.

3. A method of cracking hydrocarbon oils which comprises passing the oil in vapor form while at cracking temperature in contact with a catalyst comprising alumina and boron oxide formed by initially precipitating aluminum hydroxide from an aluminum salt solution and combining the resulting aluminum hydroxide with boric acid followed by drying the resulting mixture.

WILHELM MICHAEL.
ADAM BUETTNER.